F. A. PREUSS.
FERTILIZER DISTRIBUTER.
APPLICATION FILED JULY 6, 1908.
951,221.
Patented Mar. 8, 1910.
2 SHEETS—SHEET 2.
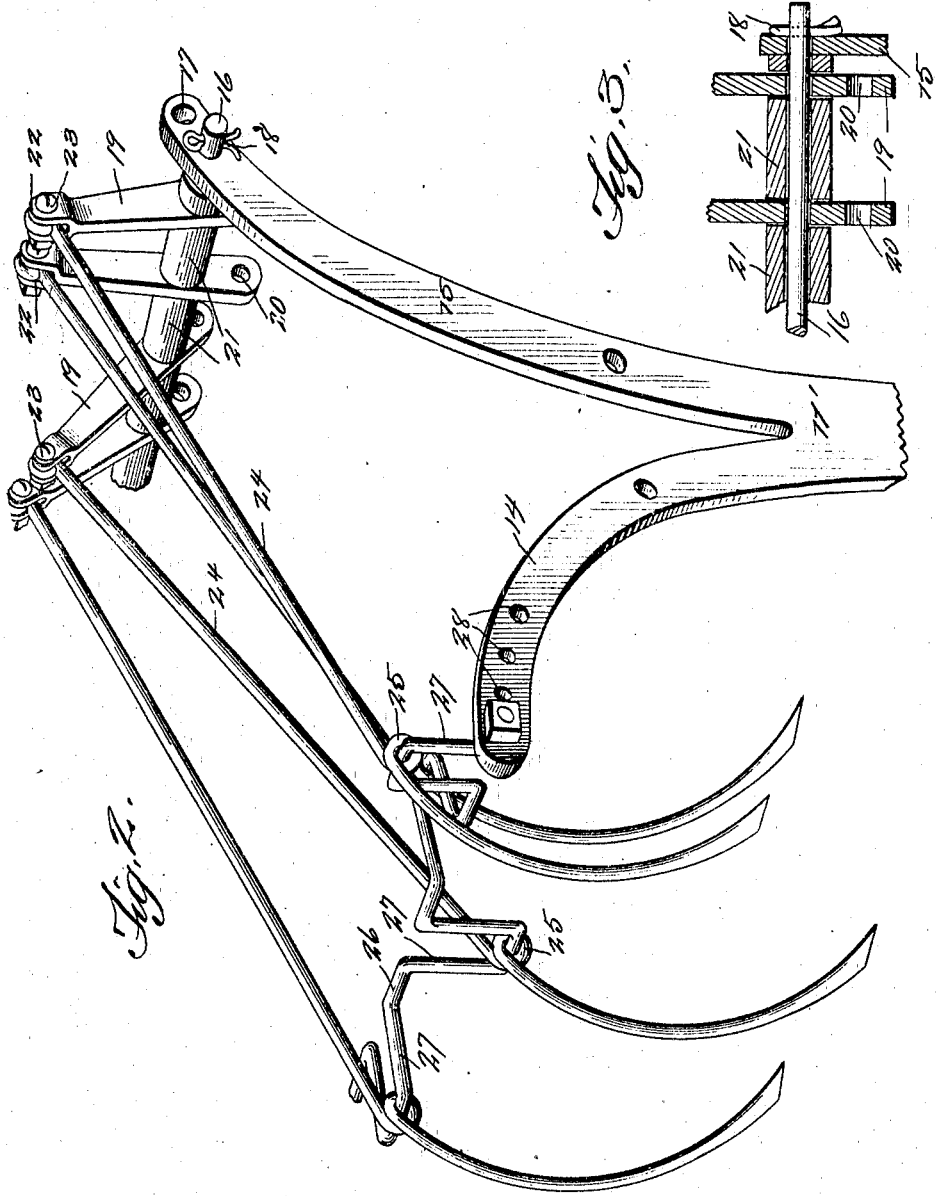
Witnesses
Inventor
Fredrick A. Preuss
By F. J. Larson & Co
Attorneys

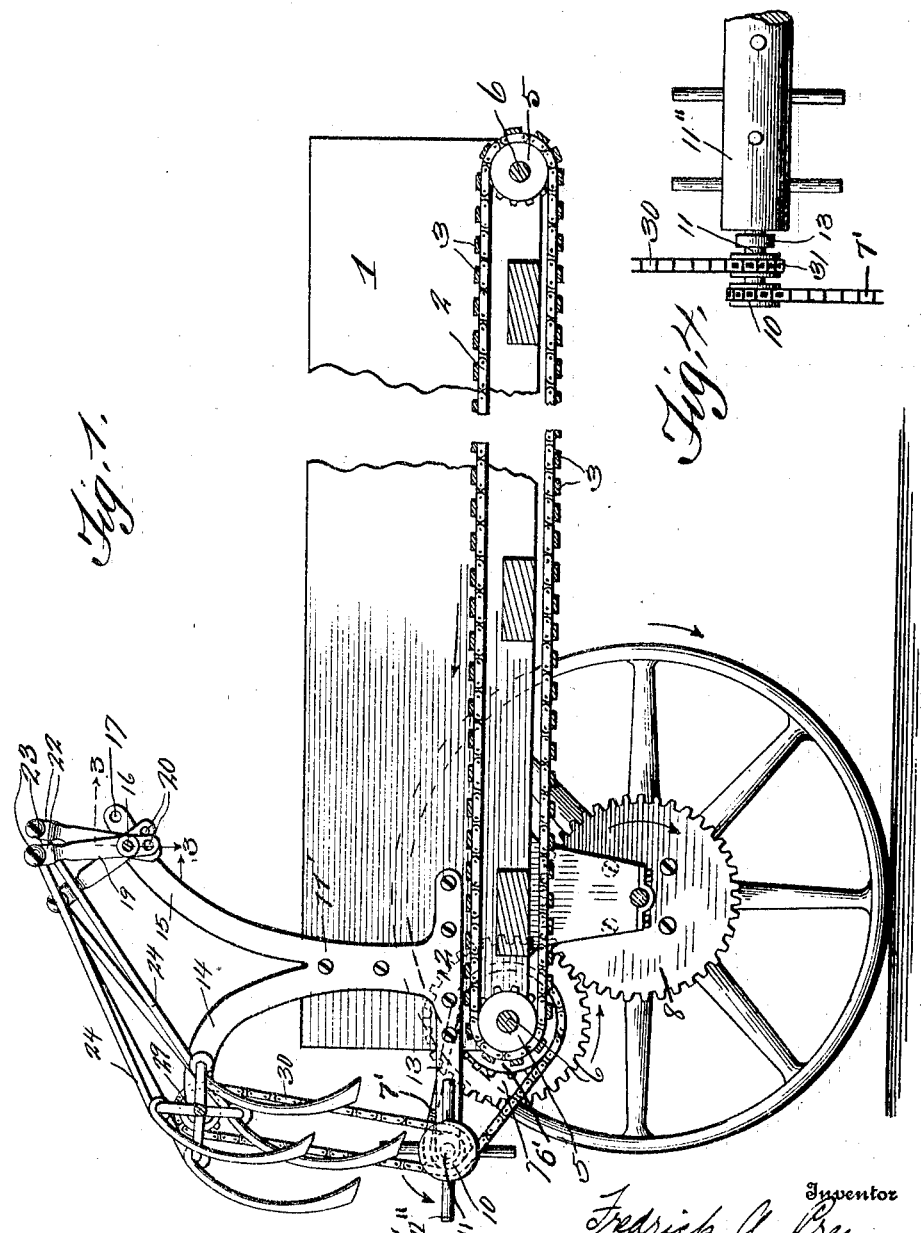

UNITED STATES PATENT OFFICE.

FREDRICK A. PREUSS, OF MADISON COUNTY, NEBRASKA.

FERTILIZER-DISTRIBUTER.

951,221.  Specification of Letters Patent.  Patented Mar. 8, 1910.

Application filed July 6, 1908. Serial No. 442,186.

*To all whom it may concern:*

Be it known that I, FREDRICK A. PREUSS, a citizen of the United States, residing in the county of Madison and State of Nebraska, have invented certain new and useful Improvements in Fertilizer-Distributers, of which the following is a specification.

This invention pertains to improvements in fertilizer distributers.

The object of the invention is to provide an improved mechanism which will distribute the fertilizer evenly, positively and uniformly, and which will effectually disintegrate the material prior to its final discharge.

Further the invention aims to generally improve and simplify the construction, and to provide an efficient and thoroughly practical device at a comparatively small cost of manufacture.

In the drawings: Figure 1, is a side elevation partly in section of a wagon equipped with the invention, Fig. 2, is a fragmentary perspective view of the fork ejector mechanism, Fig. 3, is a detail view taken on line 3—3 of Fig. 1, and Fig. 4, is a fragmentary detail view of the driving means for the toothed distributing cylinder or roll.

The invention is illustrated in the drawings as applied to a wagon 1, equipped with a well known conventional type of endless bottom 2, known to those versed in the prior art. As has been formerly practiced the bottom is comprised of a series of spaced transverse slats 3, secured to endless chains 4, the latter engaging over sprocket wheels 5, keyed to shafts 6. For the purpose of imparting retrograde movement to the upper side of the bottom during forward movement of the wagon I provide the rear shaft 6, with a gear 7, in mesh with a gear 8, the latter being mounted on the rear axle of the wagon running gear. Shaft 6, also has secured thereto a sprocket wheel 6′ engaged by a chain 7′, which latter engages sprocket 10, secured on shaft 11, of the toothed distributing roll or cylinder 11″.

To each inner face of the wagon sides at the rear thereof is secured a bracket 11′, having a forked upper end and a horizontal base 12, screws being used at intervals to rigidly secure the bracket in position. The rearward arm 13 of each bracket base 12, is apertured and receives shaft 11, of the distributing roll or cylinder as observed in Fig. 4. The toothed cylinder, as shown, is supported in approximate alinement with the upper side of bottom 2, and is adjacent to the rear end of the bottom. The forks 14, and 15 of brackets 11′, are curved and extend in opposite directions, fork 15 being of greater height than fork 14. A rod 16, is secured in one of a plurality of apertures 17, in each fork 15, being held against lengthwise movement by means of cotter pin 18. A series of rocking arms or supports 19, are loosely received by rod 16 in one of a plurality of openings 20 therein, the arms being held in determinate spaced relation by means of spacing sleeves 21, depicted in Fig. 2. Each arm 19, is bifurcated at its upper end forming spaced ears 22, between which one end of the fork ejector tines 24 is pivoted by means of bolts 23. Each tine is curved at its free end and at the point of juncture of the curved part with the straight portion of the tine is provided with an eye 25, formed by bending the wire of which the tines are made about a mandrel or its equivalent, in an obvious manner. The free extremities of the curved parts of the tines are enlarged or flattened and given a knife-like edge so as to cut or chop the fertilizer and assist in disintegrating the same and breaking up any formation of lumps or the like, at the time the ejector fork is acting upon the material, to regulate and assist in its discharge. The individual tines are given a reciprocating movement by means of a crank member 26, formed from a rod or section of wire. Each tine has connection by means of eyes 25, with one of a series of U-shaped cranks 27, adjacent cranks being disposed at right angles to one another as depicted clearly in Fig. 2. Fork 14, has a series of openings 28 therein which rotatably receive the ends of crank member 26. It will be obvious that by proper adjustment of crank member 26, arms 29, and rod 16, in their respective supports the free ends of the tines can be adjusted as regards their nearness to the rear end of bottom 2. Moreover since the tines operate in the space between the teeth of cylinder 11, and since the cylinder teeth rotate continuously and the tines have a chopping action, the material is assured of thorough disintegration and even, uniform discharge. To rotate crank member 26, the same is provided with a sprocket 29, over which a chain 30 passes, the latter being driven by means of a sprocket wheel 31 on shaft 11.

in operation the material having been placed within the wagon is carried rearwardly by the movement of the wagon to bring the material to ejecting or distributing cylinder 11″, the latter being rotated in the same direction as that of the travel of the upper side of apron 2, where, upon being engaged by the teeth of cylinder 11″, the material is moved slightly rearward and discharged. At the same time the ejector fork mechanism is assisting the material in its outward movement by chopping or breaking up the material to assure of its thorough disintegration prior to reaching the ground in which it is materially assisted by the beating action of the teeth of cylinder 11″

What I claim is:

1. In combination with a wagon, a toothed cylinder disposed in spaced relation to the rear end of the wagon, pulverizing mechanism composed of tines having curved free ends, a series of cranks arranged with adjacent cranks disposed at right angles to one another connected to said tines, a shaft having arms pivoted thereon, the opposite ends of said tines being pivoted to said arms, means operated from said cylinder for actuating said cranks, and means for rotating said cylinder, said pulverizing mechanism coöperating with said toothed cylinder to disintegrate the fertilizer thus facilitating movement of the same by the cylinder in its direction of rotation.

2. In combination with a wagon, a bracket secured to each side thereof and composed of a body, a horizontal base and a forked upper part, each of said bases projecting beyond the rear end of the wagon, a toothed cylinder journaled in said base projections, a crank mechanism journaled in one of said forks, a shaft carried by the other of said forks, arms pivoted on said shaft, tines having curved ends connected to said crank mechanism and to said arms and means to actuate said cylinder and crank mechanism.

3. In combination with a wagon, and fertilizer distributing means carried thereby, disintegrating mechanism arranged to coöperate with said means, and composed of a series of cranks formed from a single rod and arranged with adjacent cranks at right angles to one another, a tine connected to each crank, means to rotate said crank mechanism and said distributing means, and rocking supports for the rear ends of said tines, said disintegrating mechanism coöperating with said distributing means to disintegrate the fertilizer thus facilitating movement of the same by the distributing means in its direction of rotation.

4. In combination with a wagon, a rotatable distributing means carried thereby, pulverizing means arranged to coöperate with said rotatable means and composed of a series of cranks formed from a single rod and arranged with adjacent cranks at right angles to one another, a shaft carrying rocking arms, tines having their rear ends pivoted to said rocking arms, and having eyes formed intermediate their ends to receive said cranks, and having their free ends curved, and means to rotate said cranks and said rotatable means.

In testimony whereof I affix my signature, in presence of two witnesses.

FREDRICK A. PREUSS.

Witnesses:
CARL DEMMEL,
AUG. BUETTNER.